US011113217B2

(12) United States Patent
Neiger et al.

(10) Patent No.: US 11,113,217 B2
(45) Date of Patent: *Sep. 7, 2021

(54) DELIVERING INTERRUPTS TO USER-LEVEL APPLICATIONS

(71) Applicant: Intel Corporation, Santa Clara, CA (US)

(72) Inventors: Gilbert Neiger, Hillsboro, OR (US); Rajesh M. Sankaran, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/778,227

(22) Filed: Jan. 31, 2020

(65) Prior Publication Data

US 2020/0264997 A1    Aug. 20, 2020

Related U.S. Application Data

(63) Continuation of application No. 15/900,771, filed on Feb. 20, 2018, now Pat. No. 10,572,415, which is a
(Continued)

(51) Int. Cl.
*G06F 13/34* (2006.01)

(52) U.S. Cl.
CPC .............. *G06F 13/34* (2013.01); *Y02D 10/00* (2018.01)

(58) Field of Classification Search
CPC ........... G05B 2219/13001; G05B 2219/13086; G06F 13/32; G06F 2213/2412;
(Continued)

(56) References Cited

U.S. PATENT DOCUMENTS

| 7,581,051 B2 | 8/2009 | Talluri et al. |
| 9,921,984 B2 | 3/2018 | Neiger et al. |

(Continued)

FOREIGN PATENT DOCUMENTS

| CN | 1641612 A | 7/2005 |
| CN | 102483705 A | 5/2012 |
| CN | 103778009 A | 5/2014 |

OTHER PUBLICATIONS

Yangmin Seo et al., "Efficient User-leverl I/O in the ARX Real-Time Operating System," Jun. 19-20, 1998, 10 pages.
(Continued)

*Primary Examiner* — Tim T Vo
*Assistant Examiner* — Kim T Huynh
(74) *Attorney, Agent, or Firm* — Nicholson De Vos Webster & Elliott LLP

(57) ABSTRACT

Systems and methods for delivering interrupts to user-level applications. An example processing system comprises: a memory configured to store a plurality of user-level APIC data structures and a plurality of user-level interrupt handler address data structures corresponding to a plurality of user-level applications being executed by the processing system; and a processing core configured, responsive to receiving a notification of a user-level interrupt, to: set a pending interrupt bit flag having a position defined by an identifier of the user-level interrupt in a user-level APIC data structure associated with a user-level application that is currently being executed by the processing core, and invoke a user-level interrupt handler identified by a user-level interrupt handler address data structure associated with the user-level application, for a pending user-level interrupt having a highest priority among one or more pending user-level interrupts identified by the user-level APIC data structure.

19 Claims, 13 Drawing Sheets

Related U.S. Application Data continuation of application No. 14/581,677, filed on Dec. 23, 2014, now Pat. No. 9,921,984.

(58) Field of Classification Search
CPC ........... G06F 2213/2418; G06F 9/4812; G06F 13/26; G06F 2209/481
USPC .................................. 710/260–269, 240–244
See application file for complete search history.

(56) References Cited

U.S. PATENT DOCUMENTS

| | | |
|---|---|---|
| 2005/0154813 A1 | 7/2005 | DeWitt, Jr. et al. |
| 2009/0172423 A1 | 7/2009 | Song et al. |
| 2011/0040913 A1 | 2/2011 | Chung et al. |
| 2011/0040915 A1* | 2/2011 | Strauss et al. ...... G06F 13/4022 710/267 |
| 2012/0331467 A1 | 12/2012 | Neiger et al. |
| 2014/0068289 A1 | 3/2014 | Beck |
| 2014/0181555 A1 | 6/2014 | Bodas et al. |
| 2014/0181830 A1 | 6/2014 | Naik et al. |
| 2015/0089249 A1 | 3/2015 | Hannon et al. |
| 2016/0179721 A1 | 6/2016 | Neiger et al. |

OTHER PUBLICATIONS

D. Stuart Ritchie et all., "User Level IPC and Device Management in the Raven Kernel," Sep. 1993, 15 pages.

International Search Report and Written Opinion of the International Searching Authority for International Patent Application No. PCT/US2015/060424, dated Feb. 22, 2016, 11 pages.

"Intel 64 and IA-32 Architectures Software Developer's Manual vol. 3 (3A, 3B &3C): System Programming guide", Chapter 6, Intel Corporation, 1997-2015, 50 pages http://www.intel.com/content/dam/www/public/us/en/documents/manuals/64-ia-32-architectures-software-developer-system-programming-manual-325384.pdf.

The extended European Search Report for EP Application No. 15873910.2-1224/3238084 PCT US/2015060424, dated Jul. 6, 2018, 7 pages.

First Office Action, CN App. No. 201580063904.1, dated Dec. 11, 2020, 14 pages (8 pages of English Translation and 6 pages of Original Document).

European Communication pursuant to Article 94(3) EPC, EP App. No. 15873910.2, dated Jul. 1, 2019, 5 pages.

Final Office Action, U.S. Appl. No. 15/900,771, dated Feb. 21, 2019, 18 pages.

International Preliminary Report on Patentability, PCT App. No. PCT/US2015/060424, dated Jul. 6, 2017, 8 pages.

Non-Final Office Action, U.S. Appl. No. 14/581,677, dated Aug. 2, 2017, 20 pages.

Non-Final Office Action, U.S. Appl. No. 15/900,771, dated Jul. 2, 2018, 18 pages.

Non-Final Office Action, U.S. Appl. No. 15/900,771, dated Jun. 17, 2019, 21 pages.

Notice of Allowance, U.S. Appl. No. 14/581,677, dated Nov. 2, 2017, 5 pages.

Notice of Allowance, U.S. Appl. No. 15/900,771, dated Oct. 2, 2019, 6 pages.

Office Action, CN App. No. 201580063904.1, dated Dec. 2, 2019, 22 pages (15 pages of English Translation and 7 pages of Original Document).

* cited by examiner

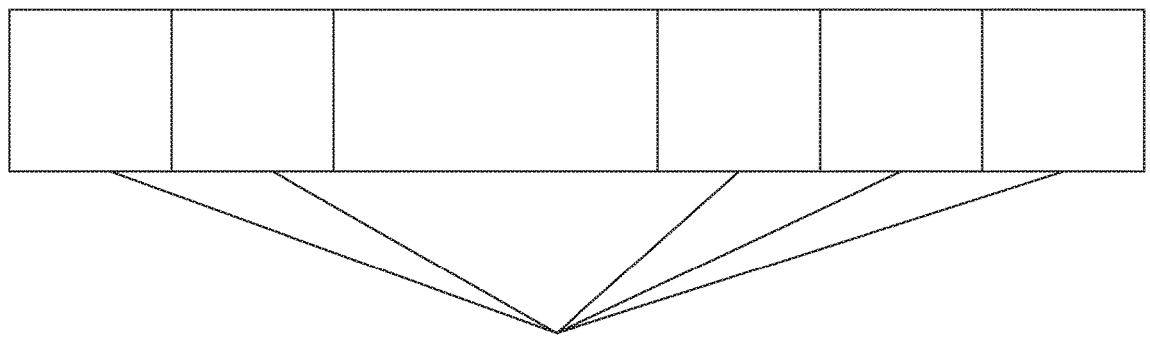
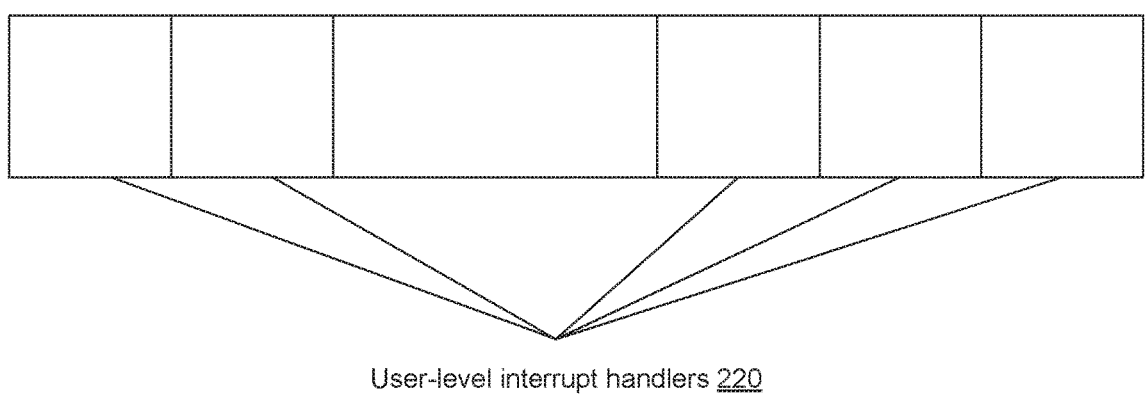
FIG. 2

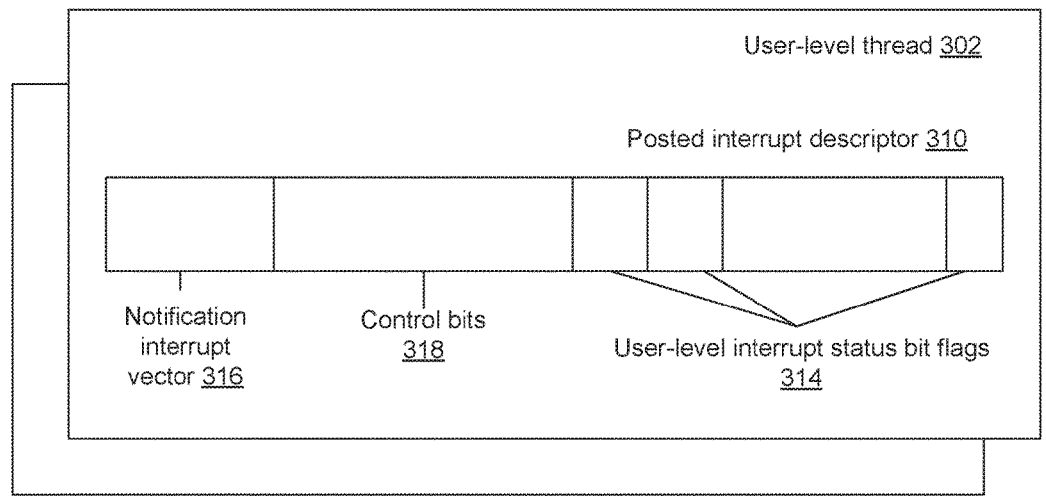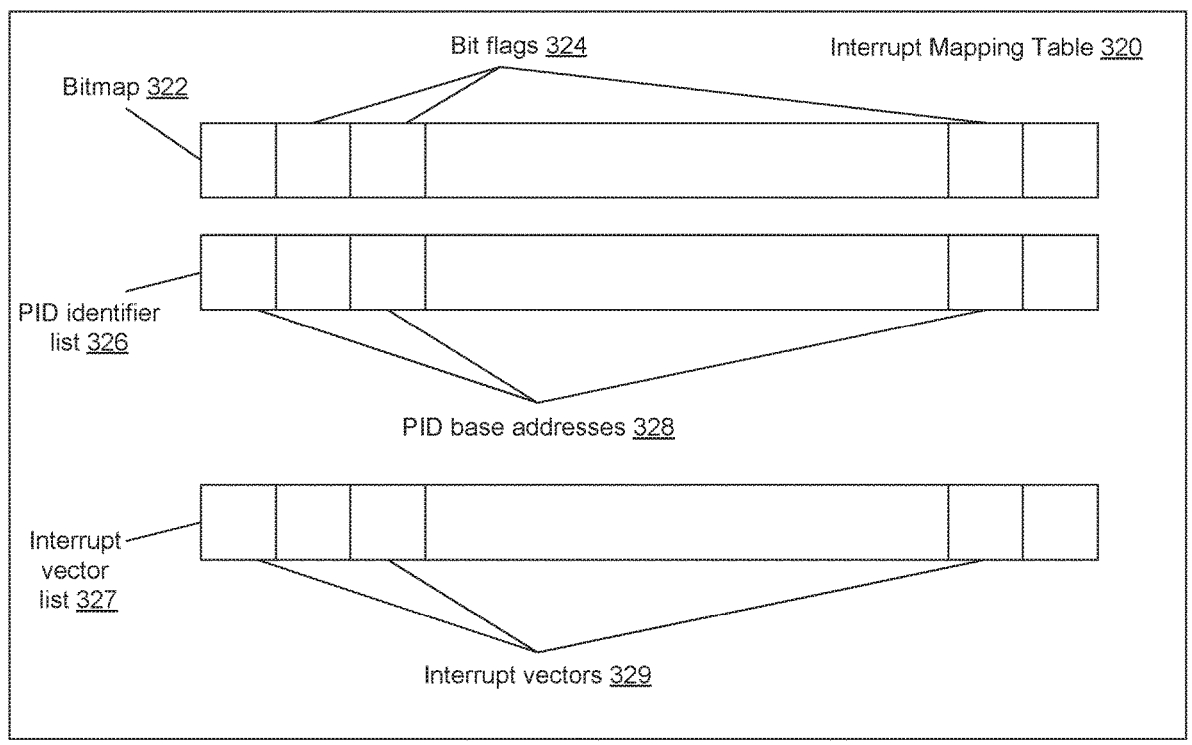
FIG. 3

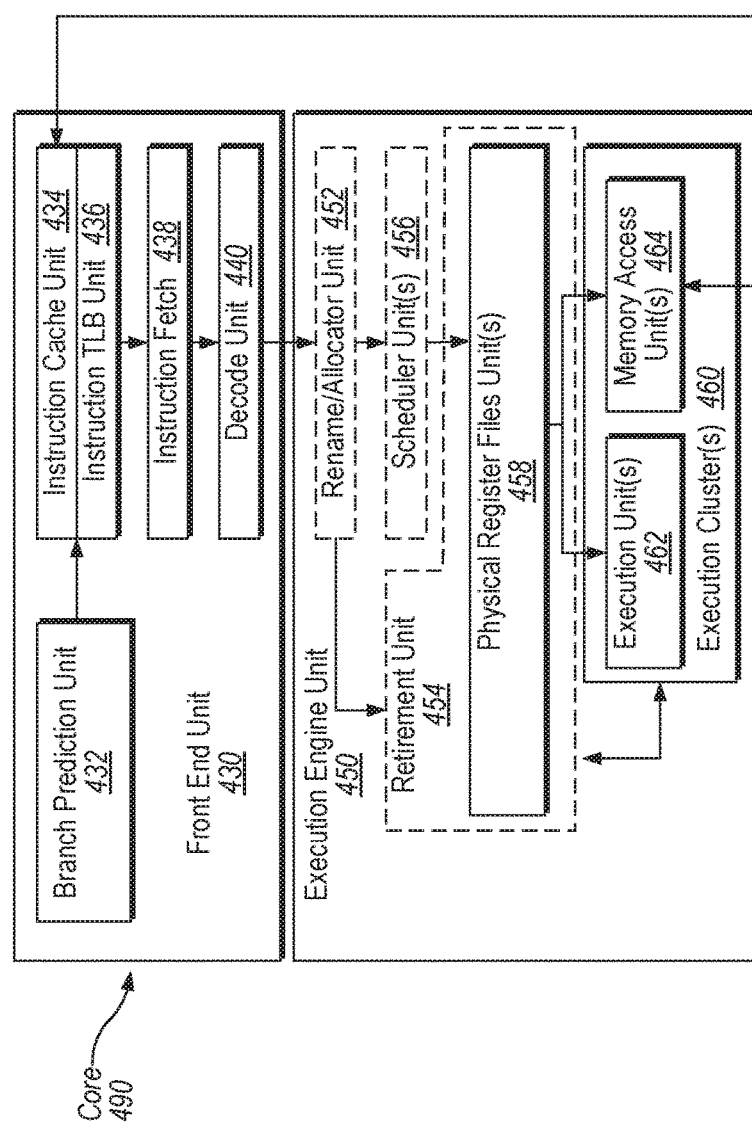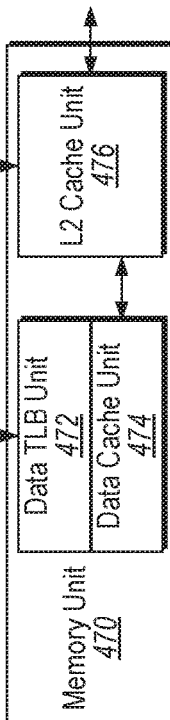

DELIVERING INTERRUPTS TO USER-LEVEL APPLICATIONS

RELATED APPLICATIONS

This application is a continuation of U.S. patent application Ser. No. 15/900,771 filed on Feb. 20, 2018, which is a continuation of U.S. patent application Ser. No. 14/581,677 filed on Dec. 23, 2014, issued as U.S. Pat. No. 9,921,984. The above-referenced applications are incorporated by reference herein in their respective entireties.

TECHNICAL FIELD

The present disclosure is generally related to processing systems, and is specifically related to systems and methods for delivering interrupts to user-level applications.

BACKGROUND

Input/output (I/O) devices external to the central processing unit (CPU) may be managed by software modules (drivers) which operate at the kernel privilege level. Notifications from an I/O device may be delivered to the corresponding driver in the form of interrupts. Interrupts are typically delivered first to the operating system (OS) kernel, which then may pass control to an appropriate driver.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2 schematically illustrates an example user-level APIC data structure and an example of user-level interrupt handler address data structure associated with a user-level thread, in accordance with one or more aspects of the present disclosure;

FIG. 3 schematically illustrates example data structures employed by example methods of posting user-level interrupts by the platform hardware, in accordance with one or more aspects of the present disclosure.

FIGS. 8a-8b schematically illustrate elements of a processor micro-architecture, in accordance with one or more aspects of the present disclosure;

DETAILED DESCRIPTION

Figure 1:
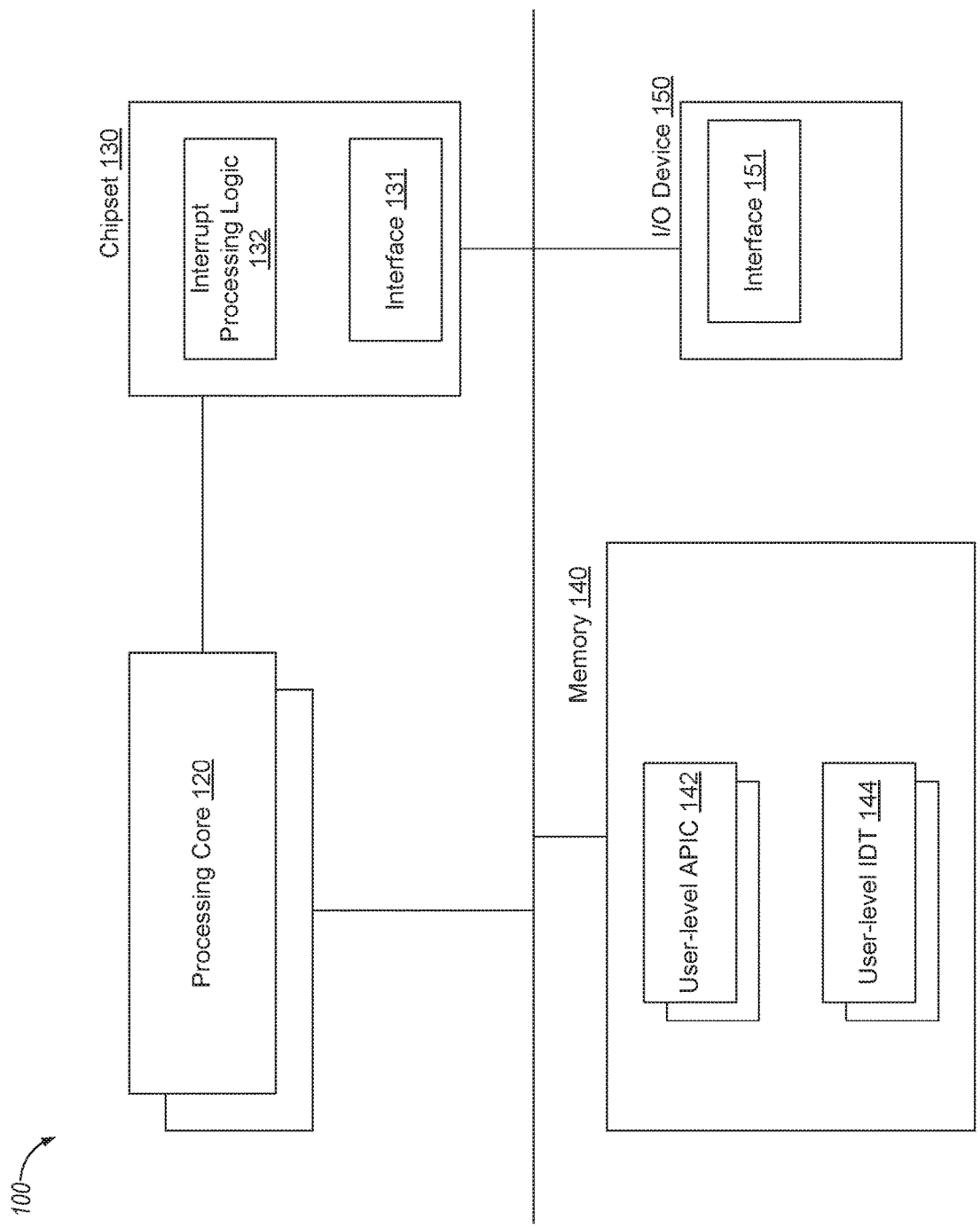
FIG. 1 depicts a high-level component diagram of an example processing system, in accordance with one or more aspects of the present disclosure.

Described herein are processing systems and related methods for delivering interrupts to user-level applications. In common implementations, user-level application may interact with an I/O device via a corresponding driver executing in the kernel mode. In an illustrative example, an application may execute a system call, which causes a transition to the kernel mode. The OS kernel may process the system call by passing control to the device driver. The driver may then interact with the I/O device to perform an operation requested by the application. When the I/O device completes the operation, it may notify the application via an interrupt, which may be handled by the OS kernel and the device driver. The latter may then notify the application (e.g., by invoking a callback handler that was previously registered by the application).

Thus, the application's interaction with the I/O device may cause multiple privilege level transitions, including the system call from the application to the driver, the transition from the kernel mode back to the application after the I/O device operation has been initiated, the transition to the kernel level due to an interrupt, and the transition back to the application to invoke the application callback handler. Those transitions may result in additional latency on every interaction between a user-level application and an I/O device. Such latency may, in certain situations, exceed the operational latency of the I/O device. Thus, reducing or eliminating software latencies caused by privilege level transitions may significantly improve operational aspects of various user-level applications interacting with I/O devices.

In accordance with one or more aspects of the present disclosure, a processing system (e.g., a single-core or a multi-core processor) may comprise certain processing logic designed to support a new event, which is herein termed "user-level interrupt." Unlike an ordinary interrupt, a user-level interrupt is delivered to a corresponding user-level application without privilege level transitions, and may only be delivered when such an application is being executed.

A user-level interrupt event may invoke a CPU control flow modification mechanism, which is herein termed "user-level interrupt delivery." In certain implementations, user-level interrupt delivery may be triggered based on the processor state (e.g., when a certain user-level application is being executed) and by the state of certain memory data structures that may be collaboratively managed by the processor and the operating system. These and other software-configurable mechanisms and data structures may enable the processor to deliver certain I/O interrupts directly to user-level applications without redirecting the control flow to kernel-level software, as described in more details herein below.

In certain implementations, a memory data structure, which is herein termed, by analogy with the advanced programmed interrupt controller (APIC), "user-level APIC," may be collaboratively managed by the processor and the operating system. A separate instance of a user-level APIC may be created for each thread of a user-level application being executed by the processor. The user-level APIC may include a bitmap comprising a plurality of bit flags. Each bit flag may indicate the status of the user-level interrupt identified by the vector corresponding to the position of the bit flag in the bit map. In an illustrative example, the processor may set a bit to indicate that the user-level interrupt identified by the vector corresponding to the position of the bit flag in the bit map is currently pending.

The operating system may further maintain another memory data structure, which is herein termed user-level interrupt handler address data structure. A separate instance of a user-level interrupt handler address data structure may be created for each thread of a user-level application being executed by the processor. In certain implementations, the user-level interrupt handler address data structure may be represented by a table comprising a plurality of addresses of user-level interrupt handlers, indexed by the interrupt vector (which is, by analogy with Interrupt Descriptor Table (IDT), termed "User-level IDT"). Alternatively, a single a single user-level interrupt handler address may be stored in a processor register to identify a user-level interrupt handler that would be responsible for all interrupt vectors. In the latter scenario, the user-level interrupt vector may be pushed on the stack of the interrupt handler. In the following description and claims, "user-level interrupt handler address data structure" shall refer to either the above referenced table comprising a plurality of addresses of user-level interrupt handlers or to the above referenced single user-level interrupt handler address, which may be stored either in one or more processor registers or in the system memory.

Responsive to receiving a notification of a user-level interrupt while a corresponding user-level application is being executed, the processor may notify the application by invoking a user-level interrupt handler identified by the user-level interrupt handler address data structure. When the user-level interrupt handler completes the execution, the control flow may be returned to the software module that was being executed at the time the user-level interrupt was delivered. Thus, the user-level interrupt may be delivered and processed by the user-level application without causing privilege level transitions, as described in more details herein below.

In certain implementations, the processor may prioritize the user-level interrupts, e.g., based on the interrupt vector number. In an illustrative example, responsive to receiving a notification of a user-level interrupt, the processor may set a bit corresponding to the user-level interrupt vector in the user-level APIC associated with the user-level application that is currently being executed by the processor. The processor may then invoke the user-level interrupt handler identified by the user-level interrupt handler address data structure associated with the user-level application, for a pending user-level interrupt having the highest priority among one or more pending user-level interrupts identified by the user-level APIC, as described in more details herein below.

Various aspects of the above referenced methods and systems are described in more details herein below by way of examples, rather than by way of limitation.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation in order to provide a thorough understanding of the present disclosure. It will be apparent, however, to one skilled in the art that these specific details need not be employed to practice the methods disclosed herein. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Although the following examples are described with reference to a processor, other implementations are applicable to other types of integrated circuits and logic devices. Similar techniques and teachings of examples described herein can be applied to other types of circuits or semiconductor devices that can benefit from higher pipeline throughput and improved performance. The teachings of examples described herein are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed.

The examples illustrating the present disclosure and accompanied drawings should not be construed in a limiting sense as they are merely intended to provide examples of embodiments described herein rather than to provide an exhaustive list of all possible implementations of embodiments described herein. Although the below examples describe instruction handling and distribution in the context of execution units and logic circuits, other implementations of the systems and methods described herein can be accomplished by way of a data or instructions stored on a machine-readable, tangible medium, which when performed by a machine cause the machine to perform functions consistent with at least one embodiment described herein. In certain implementations, functions associated with embodiments described herein are embodied in machine-executable instructions. The instructions can be used to cause a general-purpose or special-purpose processor that is programmed with the instructions to perform the methods described herein. Implementations described herein may be provided as a computer program product or software which may include a machine or computer-readable medium having stored thereon instructions which may be used to program a computer (or other electronic devices) to perform one or more operations according to embodiments described herein. Alternatively, operations of systems and methods described herein may be performed by specific hardware components that contain fixed-function logic for performing the operations, or by any combination of programmed computer components and fixed-function hardware components.

Instructions used to program logic to perform the methods described herein can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

"Processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

Referring now to FIG. 1, shown is a block diagram of an example processing system 100 in accordance with one or more aspects of the present disclosure. As shown in FIG. 1, processing system 100 may comprise one or more processing cores 120, which may be coupled, via a shared interconnect, to system memory 140.

Processing system 100 may further comprise a chipset 130 that supports memory operations, input/output operations, configuration, control, internal or external interface, connection, or communications functions, and/or other similar functions for processing cores 120 and/or other components of processing system 100. Individual elements of chipset 130 may be grouped together on a single chip, dispersed among multiple chips, and/or be integrated partially, totally, redundantly, or according to a distributed approach into one or more processors, including processing cores 120.

In certain implementations, chipset 130 may comprise interrupt processing logic 132 which may implement user-level interrupt posting in accordance with one or more aspects of the present disclosure, as described in more details herein below. Alternatively, interrupt processing logic 132 may reside in other components of processing system 100. Various implementations of the systems and methods described herein may perform user-level interrupt delivery using unchanged or modified chipset elements that are currently used for ordinary interrupt processing.

System memory 140 may comprise one or more media on which information, such as data and/or program code, may be stored, such as static or dynamic random access memory, semiconductor-based read-only or flash memory, magnetic or optical disk memory, or any other type of medium readable by processing cores 120.

Device 150 may comprise any type of I/O device, peripheral device, or other device that may initiate an interrupt request, such as a keyboard, mouse, trackball, pointing device, monitor, printer, media card, network interface, information storage device, etc. Device 150 may be embodied in a discrete component, or may be integrated with other devices. In certain implementations, device 150 may represent a function in a multifunctional I/O, peripheral, or other device.

Processing cores 120, chipset 130, system memory 140, and device 150 may be coupled to each other directly or indirectly through one or more parallel, sequential, pipelined, asynchronous, synchronous, wired, wireless, and/or other bus or point-to-point connection or means of communication. In the illustrative example of FIG. 1, chipset 130 includes interface 131 to receive signals, messages, and/or transactions, such as interrupt requests, from device 150, or transmit signals, messages, and/or transactions to device 150 and/or any other agents or components in system 100, through any such connection or other means of communication. Similarly, device 150 includes interface 151 to transmit and/or receive signals, messages, and/or transactions to chipset 130, and/or any other agents or components of processing system 100. In certain implementations, processing system 100 may also include various other components not shown in FIG. 1.

In certain implementations, memory 140 may be utilized to store a plurality of user-level APIC data structures 142 and a plurality of user-level interrupt handler address data structures 144 associated with a plurality of user-level threads being executed by processing system 100, as described in more details herein below. Alternatively, user-level APIC data structures 142 and/or user-level interrupt handler address data structures 144 may be stored in registers of processing cores 120. The base addresses of user-level APIC data structure 142 and/or user-level interrupt handler address data structure 144 associated with a given user thread may be stored in the XSAVE area employed by the operating system to load the state on a context switch. In certain implementations, the processor may, on a context switch, load the base addresses of user-level APIC data structure 142 and/or user-level interrupt handler address data structure 144 stored in the XSAVE area into certain processor registers.

Ordinary interrupts are distinguished from each other by their respective unique interrupt types, or interrupt numbers, often referred to as "interrupt vectors." User-level interrupts may share the vector space with ordinary interrupts (so that every interrupt vector identifies either an ordinary interrupt or a user-level interrupt), or they may be allocated a dedicated user-level interrupt vector space. Separating the vector spaces allow independent prioritization of user-level interrupts by each user-level application, thus facilitating dynamic migration of user threads across processing cores.

A processor may be configured to track pending user-level interrupts using a plurality of user-level APIC data structures 142 associated with a plurality of user-level threads being executed by the processor, as schematically illustrated by FIG. 2. Each user-level APIC data structure 142 may include a bitmap comprising plurality of bit flags 210. The position of each bit flag within the bitmap may correspond to an interrupt number identifying the user-level interrupt type to be processed by the user-level application associated with the user-level APIC data structure. Responsive to receiving a notification of one or more user-level interrupts (e.g., in the form of one or more bits set in the posted interrupt descriptor, as described in more details herein below), the processor may set one or more bits corresponding to the user-level interrupt vectors in the user-level APIC data structure associated with the user-level application that is currently being executed by the processor. The base address of a user thread's user-level APIC data structure may be stored in that thread's XSAVE area.

In certain implementations, the processor may maintain a software-controlled masking bit for user-level interrupts. A certain value of this bit may prevent the processor from delivering any user-level interrupts until the bit value is changed. In an illustrative example, the processor may set the masking bit to mask user-level interrupts as part of the user-level interrupt delivery procedure that is described in more details herein below. Conversely, the user-level interrupt handler (or the instruction that returns the flow control from the user-level interrupt handler) may clear the bit to allow the user-level interrupt delivery. The masking bit may reside in an existing processor register or in a newly defined processor register. The processor may support new instructions to allow reading and writing of the bit, either individually or as a part of the register in which the bit resides.

In certain implementations, the processor may prioritize the user-level interrupts that have not yet been delivered, e.g., based on the interrupt vector number. In an illustrative example, priorities may be associated with interrupt vector numbers in the ascending order, so that the lowest priority is given to the lowest vector number, the second priority is given to the second lowest vector number, and the highest priority is given to the highest vector number. The processor may select for delivery a pending user-level interrupt having the highest priority among one or more pending user-level interrupts identified by the user-level APIC bits.

In addition to tracking pending user-level interrupts, the processor may, in certain implementations, track the interrupts that have been delivered but are still being serviced by the software. In this case, the processor may deliver a user-level interrupt only if its vector number exceeds the highest vector number of the interrupts that are currently being serviced. To facilitate this user-level interrupt delivery mode, the processor may support a mechanism (e.g., implemented by a new instruction and/or a new register) by which the software may indicate the completion of user-level interrupt servicing. In addition, the processor may support a mechanism by which the software may limit the types of user-level interrupts to be delivered (e.g., by indicating the lowest vector that should be delivered).

The processor may then identify the interrupt handler associated with the selected highest priority interrupt, by looking up the user-level interrupt handler address in the user-level interrupt handler address data structure associated with the user-level application. The base address of a user thread's user-level interrupt handler address data structure may be stored in that thread's XSAVE area. In certain implementations, the user-level interrupt handler address data structure may be represented by a table 144 comprising a plurality of addresses of user-level interrupt handlers 220, indexed by the interrupt vector, as schematically illustrated by FIG. 2. Alternatively, the user-level interrupt handler address data structure may comprise the address of a single user-level interrupt handler that would be responsible for all interrupt vectors.

The processor may then invoke the identified user-level interrupt handler. In an illustrative example, the processor may then store on the stack the current value of the Instruction Pointer (IP), and load the identified user-level interrupt handler address into the IP. When invoking the identified user-level interrupt handler, the processor may also set the masking bit for user-level interrupts to mask user-level interrupts; the processor register containing this masking bit may be among those that the processor earlier stored on the stack. The user-level interrupt handler may save, in memory or on the stack, values of one or more components of CPU state (e.g., processor registers). The user-level interrupt handler may comprise a plurality of instructions designed to process the pending interrupt (e.g., copy certain data from a memory buffer associated with an I/O device into a memory buffer allocated by the application, or vice versa). The user-level interrupt handler may complete by restoring the saved CPU state executing a return (e.g., RET) instruction that loads the IP with the address that is stored on the top of the stack, thus passing the control flow to the instruction following the one that had been executed instruction before the user-level interrupt was delivered. In certain implementations, flow control return from the user-level interrupt handler may be performed by using an existing return instruction. Alternatively, a new instruction may be added to the instruction set for effectuating flow control return from a user-level interrupt handler. Such a new instruction may clear the masking bit for user-level interrupts to unmask user-level interrupts; alternatively, it may load from the stack the processor register containing this masking bit. In various illustrative examples, other mechanisms of invoking the identified interrupt handler may be employed.

In certain implementations, notifications from I/O devices may be explicitly marked as user-level interrupts as such notifications are transmitted through the platform hardware (e.g., chipset 130 or processor uncore) to the CPU. Alternatively, the notifications may be implemented through ordinary interrupt messages with ordinary interrupt vectors.

The processor may determine which interrupts should be treated as user-level interrupts based on the vector number or some other property. In an illustrative example, the operating system may maintain a table having a plurality of entries corresponding to the plurality of ordinary interrupt vectors. Each entry of the interrupt mapping table may comprise a bit flag indicating whether the processor should convert the corresponding interrupt into a user-level interrupt. In certain implementations, each entry of the interrupt mapping table may further comprise the user-level interrupt vector that should be used for the corresponding interrupt delivery. Alternatively, the processor may keep the vector of the ordinary interrupt when delivering a user-level interrupt in response to receiving an ordinary interrupt message. In certain implementations, an interrupt request may be identified as a kernel interrupt or user-level interrupt, allowing it to be processed independently through separate interrupt mapping tables. In another implementation, an interrupt request may be processed through a common interrupt mapping table, where the entry used to map the interrupt request is programmed to specify if the interrupt request is to be processed as a kernel interrupt or user-level interrupt.

In certain implementations, the platform hardware (e.g., chipset 130 or processor uncore) may process an interrupt from an I/O device by recording information about the interrupt in a memory data structure associated with the user-level application associated with the incoming interrupt vector. As schematically illustrated by FIG. 3, for each user thread 302 that may receive user-level interrupts, the operating system may create and maintain a memory data structure 310 which is herein termed "posted interrupt descriptor". Posted interrupt descriptor 310 may include a bitmap comprising a plurality of bit flags 314. Each bit flag 314 may indicate the status of the user-level interrupt identified by the vector corresponding to the position of the bit flag in the bit map. In an illustrative example, the platform hardware may set a bit corresponding to a pending user-level interrupt vector.

Posted interrupt descriptor 310 may further comprise a notification interrupt vector 316 identifying the ordinary interrupt that the platform hardware may employ to notify the processor of pending user-level interrupts, as described herein below. Posted interrupt descriptor 310 may further comprise one or more control bits 318 that may be used by the software and/or other agents of the processing system.

The operating system may further create and maintain an interrupt mapping table 320 including a bitmap 322 comprising a plurality of bit flags 324. Each bit flag 324 may indicate whether the processor should convert the interrupt from an interrupt source identified by the position of the bit flag within bitmap 322 into a user-level interrupt. Interrupt mapping table 320 may further comprise a list 326 of identifiers (e.g., base addresses) 328 of posted interrupt descriptors. Each posted interrupt descriptor may be associated with the user thread that is associated with the source of the ordinary interrupt identified by the position of the posted interrupt descriptor within list 326.

In certain implementations, interrupt mapping table 320 may further comprise a list 327 of interrupt vectors 329 that should be used for the corresponding user-level interrupt delivery. Alternatively, the processor may keep the vector of the ordinary interrupt when delivering a user-level interrupt in response to receiving an ordinary interrupt message.

Responsive to receiving an interrupt from an I/O device, the platform hardware may look up the interrupt source identifier (e.g., represented by the device number) in interrupt mapping table 320. If the bit flag 324 associated with the interrupt source indicates that the interrupt should be processed as a user-level interrupt, the platform hardware may retrieve, from interrupt mapping table 320, the base address 328 of posted interrupt descriptor 310 associated with the interrupt source. The platform hardware may then set, in posted interrupt descriptor, the bit flag 314 indicating that the corresponding user-level interrupt is pending. Bit flag 314 will then be cleared by the processor to acknowledge the receipt of the posted interrupt. Upon setting bit flag 314, the platform hardware may transmit to the processor a notification interrupt having the vector identified by notification interrupt vector field 316 of posted interrupt descriptor 310.

Responsive to receiving an interrupt, the processor may compare the interrupt vector with the notification interrupt vector of the user thread that is currently being executed by the processor. In an illustrative example, the notification interrupt vector of the current user thread may be identified by the posted interrupt descriptor 310. Alternatively, the notification interrupt vector of the current user thread may be identified by a control register that is programmable by the operating system. Responsive to determining that the incoming interrupt is not a notification interrupt, the processor may deliver the incoming interrupt using the common interrupt delivery mechanism (e.g., passing the control flow to the interrupt handler identified by IDT lookup). Alternatively, responsive to determining that the incoming interrupt vector matches the notification interrupt vector, the processor may process the posted user-level interrupts.

Processing of posted user-level interrupts may comprise reading, by the processor, bit flags 314 of posted interrupt descriptor 310 associated with the current user thread. The processor may set, in user-level APIC data structure 142 associated with the current user thread, bit flags 210 at the positions of the set bit flags 314 of posted interrupt descriptor 310. The processor may then trigger a micro-architectural event to indicate the presence of a pending user-level interrupt. Responsive to detecting the micro-architectural event, the processor may select the highest priority user-level interrupt for delivery, identify the interrupt handler for the selected user-level interrupt by looking up the user-level interrupt handler address data structure, and invoke the identified interrupt handler, as described in more details herein below with reference to FIG. 5B.

Figure 4:
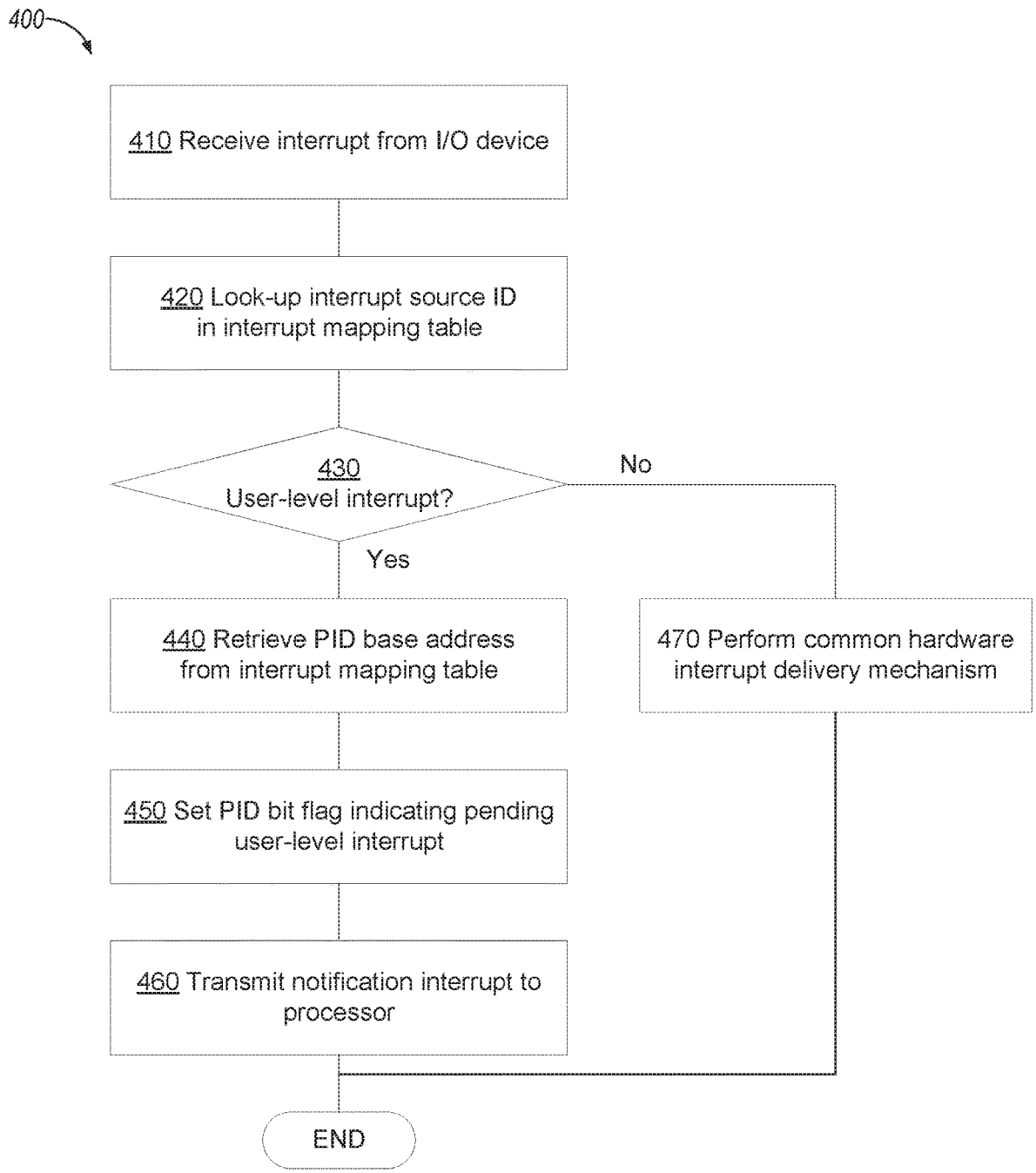
FIG. 4 depicts a flow diagram of an example method for posting user-level interrupts by the platform hardware, in accordance with one or more aspects of the present disclosure.

FIG. 4 depicts a flow diagram of an example method for posting user-level interrupts by the platform hardware, in accordance with one or more aspects of the present disclosure. Method 400 may be performed by a computer system that may comprise hardware (e.g., circuitry, dedicated logic, and/or programmable logic), software (e.g., instructions executable on a computer system to perform hardware simulation), or a combination thereof. Method 400 and/or each of its functions, routines, subroutines, or operations may be performed by one or more physical processors and/or other components of the computer system executing the method. In one example, as illustrated by FIG. 4, method 400 may be performed by the processing systems described herein below and illustrated by FIGS. 6-12.

Referring to FIG. 4, at block 410, the platform hardware implementing the method may receive an interrupt from an I/O device.

At block 420, the platform hardware may look up the interrupt source identifier (e.g., represented by the device number) in the interrupt mapping table that is managed by the operating system to indicate to the platform hardware which interrupts should be treated as user-level interrupts, as described in more details herein above.

Responsive to determining, at block 430, that the bit flag associated with the interrupt source indicates that the interrupt should be processed as a user-level interrupt, the processing may continue at block 440; otherwise, the method may branch to block 470 to perform the common hardware interrupt delivery mechanism.

At block 440, the platform hardware may retrieve, from the interrupt mapping table, the base address of the posted interrupt descriptor associated with the interrupt source, as described in more details herein above.

At block 450, the platform hardware may set, in the posted interrupt descriptor, the bit flag indicating that the corresponding user-level interrupt is pending.

At block 460, the platform hardware may transmit to the processor a notification interrupt having the vector identified by the notification interrupt vector field of the posted interrupt descriptor, as described in more details herein above, and the method may terminate.

Figure 5A:
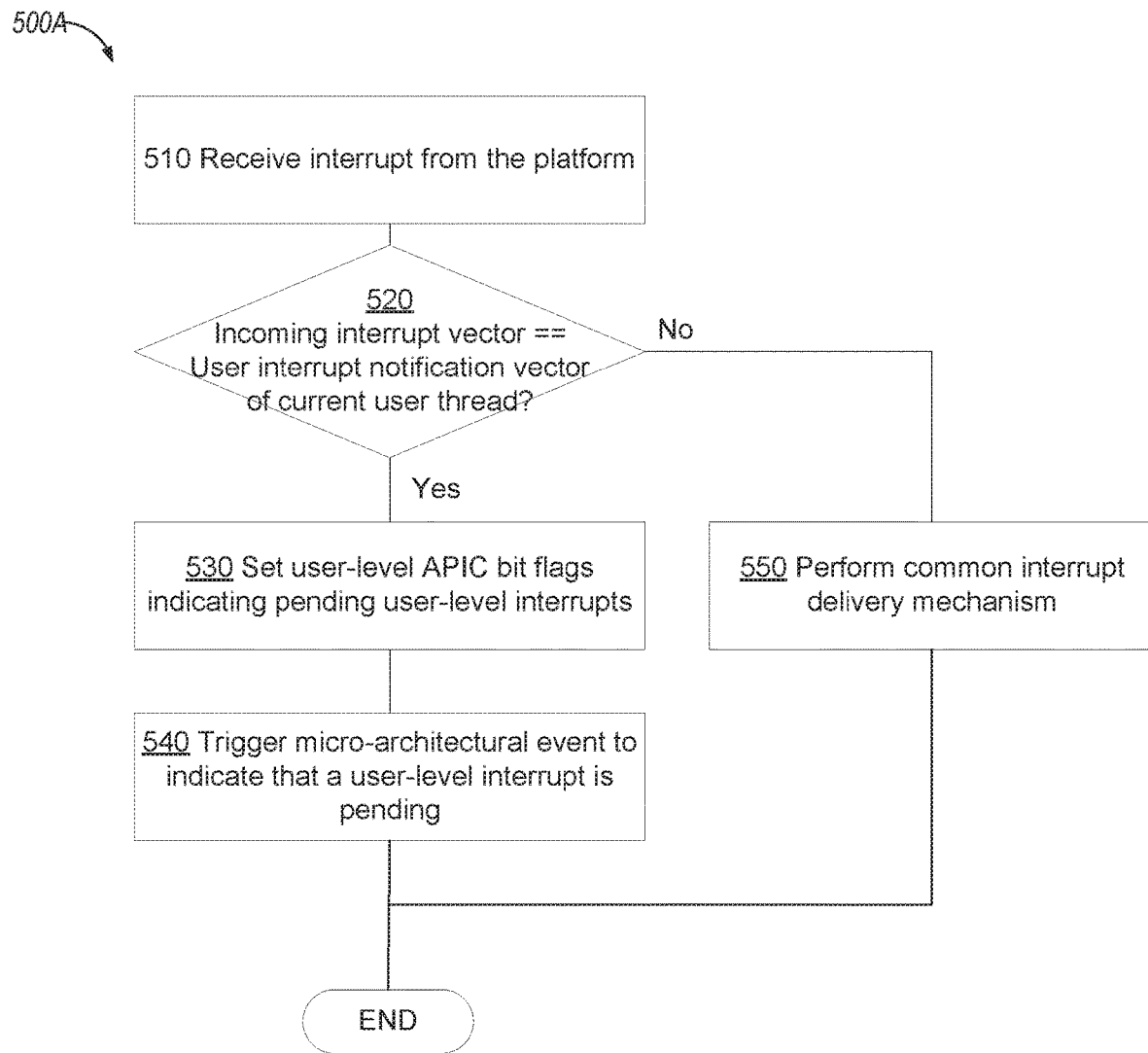
FIGS. 5A-5B depict flow diagrams of example methods for delivering interrupts to user-level applications, in accordance with one or more aspects of the present disclosure.
Figure 5B:
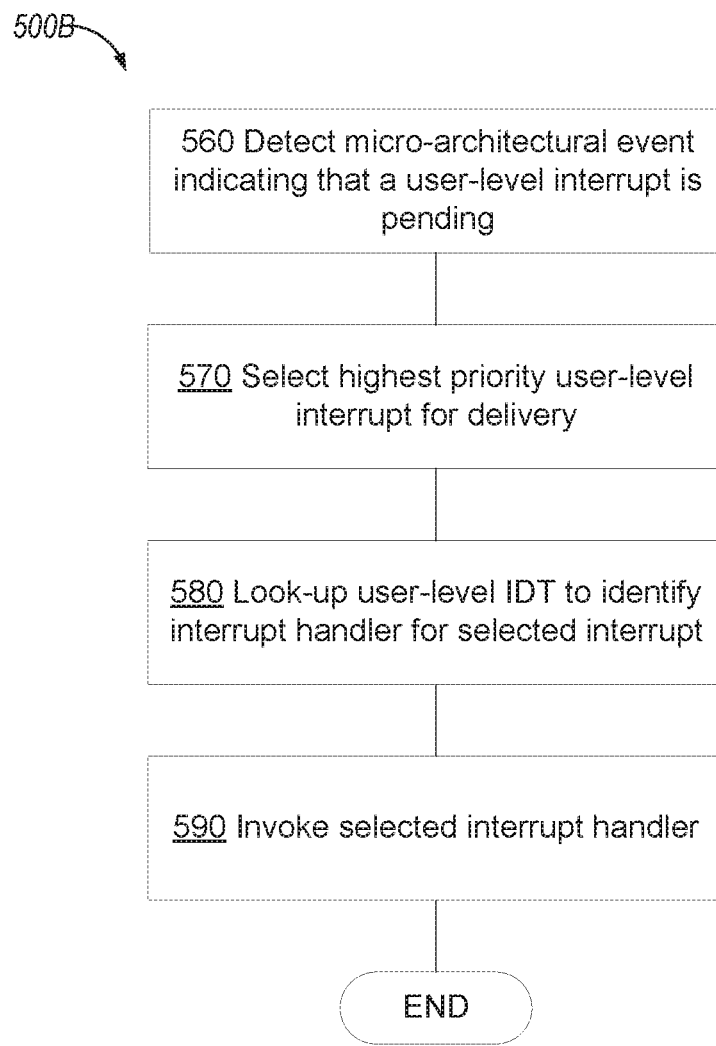

FIGS. 5A-5B depict flow diagrams of example methods for delivering interrupts to user-level applications, in accordance with one or more aspects of the present disclosure. In particular, method 500A illustrates processing of a notification interrupt, and method 500B illustrates the user-level interrupt delivery. Methods 500A-500B may be performed by a computer system that may comprise hardware (e.g., circuitry, dedicated logic, and/or programmable logic), software (e.g., instructions executable on a computer system to perform hardware simulation), or a combination thereof. Methods 500A-500B and/or each of their functions, routines, subroutines, or operations may be performed by one or more physical processors and/or other components of the computer system executing the method. In one example, as illustrated by FIGS. 5A-5B, methods 500A-500B may be performed by the processing systems described herein below and illustrated by FIGS. 6-12.

Referring to FIG. 5A, at block 510, the processor implementing the method may receive an interrupt from the platform.

Responsive to determining, at block 520, that the incoming interrupt vector matches the notification interrupt vector of the current user thread, the processing may continue at block 530; otherwise the method may branch to block 550 to perform the common interrupt delivery mechanism.

At block 530, the processor may set, in the user-level APIC data structure associated with the current user thread, bit flags at the positions of the set bit flags of the posted interrupt descriptor associated with the current user thread, as described in more details herein above.

At block 540, the processor may, based on the state of the user-level APIC, trigger a micro-architectural event to indicate the presence of a pending user-level interrupt, in order to trigger method 500B for the delivery of the pending user-level interrupt.

Method 500B illustrates the user-level interrupt delivery. The method may be triggered by the micro-architectural event caused by method 500A to indicate the presence of a pending user-level interrupt. Thus, method 500B may invoked at some point in time after the micro-architectural event was asserted, depending on several conditions, including, e.g., whether the user-level interrupts are masked and whether the current privilege level allows user-level interrupt processing.

At block 560, the processor may detect a micro-architectural event indicating the presence of a pending user-level interrupt.

At block 570, the processor may select for delivery a pending user-level interrupt having the highest priority among one or more pending user-level interrupts identified by the user-level APIC bits, as described in more details herein above.

At block 580, the processor may identify the interrupt handler associated with the selected highest priority interrupt, by looking up the interrupt handler address in the user-level interrupt handler address data structure associated with the user-level application, as described in more details herein above.

At block 590, the processor may invoke the identified user-level interrupt handler, as described in more details herein above, and the method may terminate.

The systems and methods described herein perform interrupt delivery to user-level applications. Although various systems and methods are described herein with reference to specific integrated circuits, such as processors, other implementations may be applicable to other types of integrated circuits and logic devices. Techniques and teachings of systems and methods described herein may be applied to other types of circuits or semiconductor devices that may also benefit from better energy efficiency and energy conservation. For example, the disclosed implementations are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications may include a microcontroller, a digital signal processor (DSP), network computers (NetPC), set-top boxes, network hubs, wide area network (WAN) switches, or any other system that can perform the functions and operations taught below. Moreover, the systems and methods described herein are not limited to physical computing devices, but may also relate to software-implemented methods. Power savings realized by systems and methods described herein may be independent of and complementary to an operating system (OS)-based mechanism, such as the Advanced Configuration and Platform Interface (ACPI) standard.

The methods and systems described herein above may be implemented by computer system of various architectures, designs and configurations for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable to implement the methods described herein. In general, a large variety of systems or electronic devices capable of incorporating a processor and/or other execution logic as disclosed herein are generally suitable for implementing the systems and methods described herein.

Figure 6:
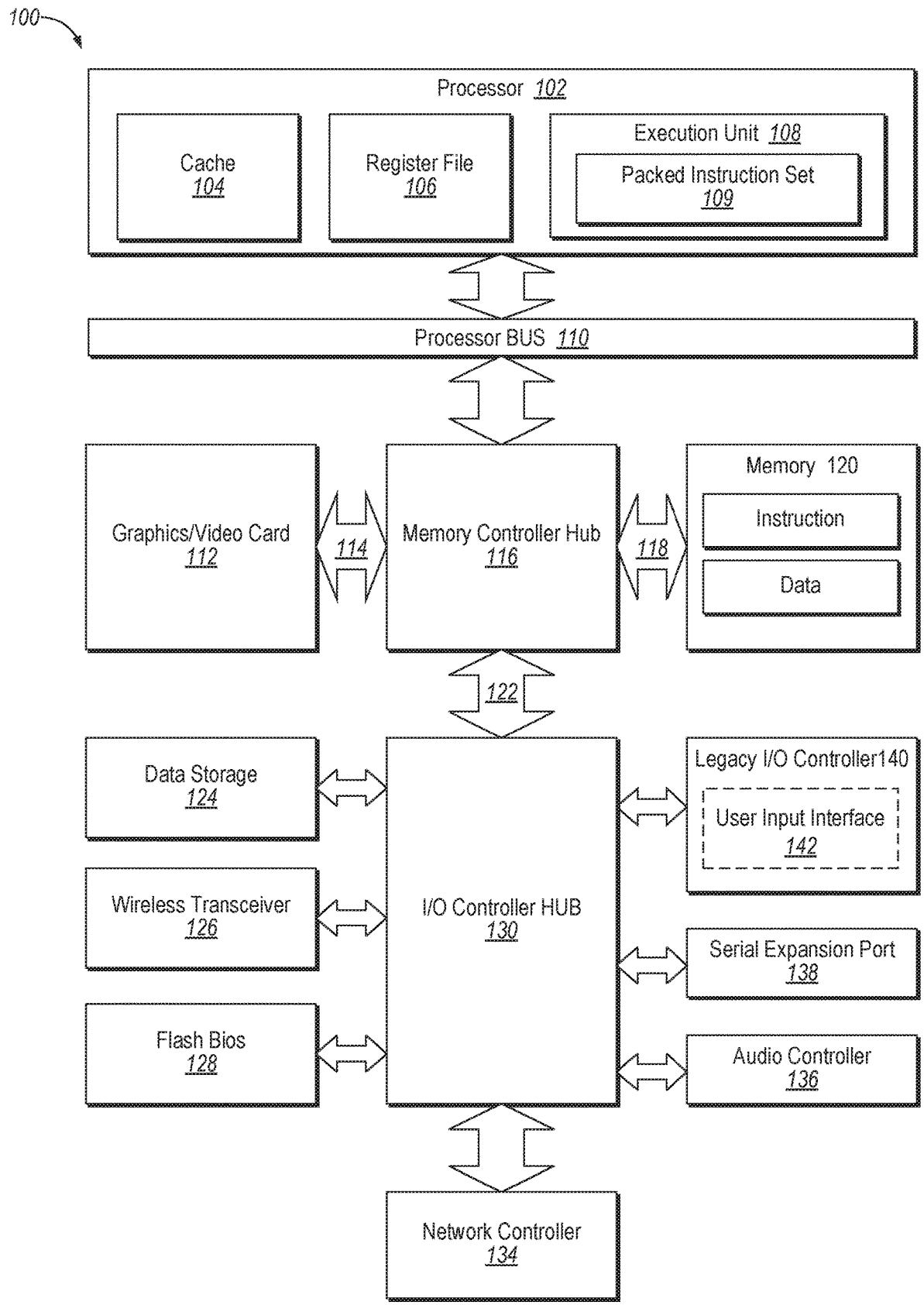
FIG. 6 depicts a high-level component diagram of an example computer system, in accordance with one or more aspects of the present disclosure.

FIG. 6 depicts a high-level component diagram of one example of a computer system in accordance with one or more aspects of the present disclosure. A processing system 100 may include a processor 110 to employ execution units including logic to perform algorithms for process data, in accordance with the present invention, such as in the embodiment described herein. System 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

In an illustrative example, processor 102 includes one or more execution units 108 to implement an algorithm that is to perform at least one instruction. One embodiment may be described in the context of a single processor desktop or server system, but alternative embodiments may be included in a multiprocessor system. The processor 102 is coupled to a processor bus 110 that transmits data signals between the processor 102 and other components in the system 100. The elements of system 100 (e.g. graphics accelerator 112, memory controller hub 116, memory 120, I/O controller hub 124, wireless transceiver 126, Flash BIOS 128, Network controller 134, Audio controller 136, Serial expansion port 138, I/O controller 140, etc.) perform their conventional functions that are well known to those familiar with the art.

In certain implementations, the processor 102 includes a Level 1 (L1) internal cache memory 104. Depending on the architecture, the processor 102 may have a single internal cache or multiple levels of internal caches. Other embodiments include a combination of both internal and external caches depending on the particular implementation and needs. Register file 106 is to store different types of data in various registers including integer registers, floating point registers, vector registers, banked registers, shadow registers, checkpoint registers, status registers, and instruction pointer register.

Execution unit 108, including logic to perform integer and floating point operations, also resides in the processor 102. The processor 102, in certain implementations, includes a microcode ROM to store microcode, which when executed, is to perform algorithms for certain macroinstructions or handle complex scenarios. Here, microcode is potentially updateable to handle logic bugs/fixes for processor 102. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate implementations of an execution unit 108 may also be used in micro controllers, embedded processors, graphics devices, DSPs, and other types of logic circuits. System 100 includes a memory 120. Memory 120 includes a dynamic random access memory (DRAM) device, a static random access memory (SRAM) device, flash memory device, or other memory device. Memory 120 stores instructions and/or data represented by data signals that are to be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

Figure 7:
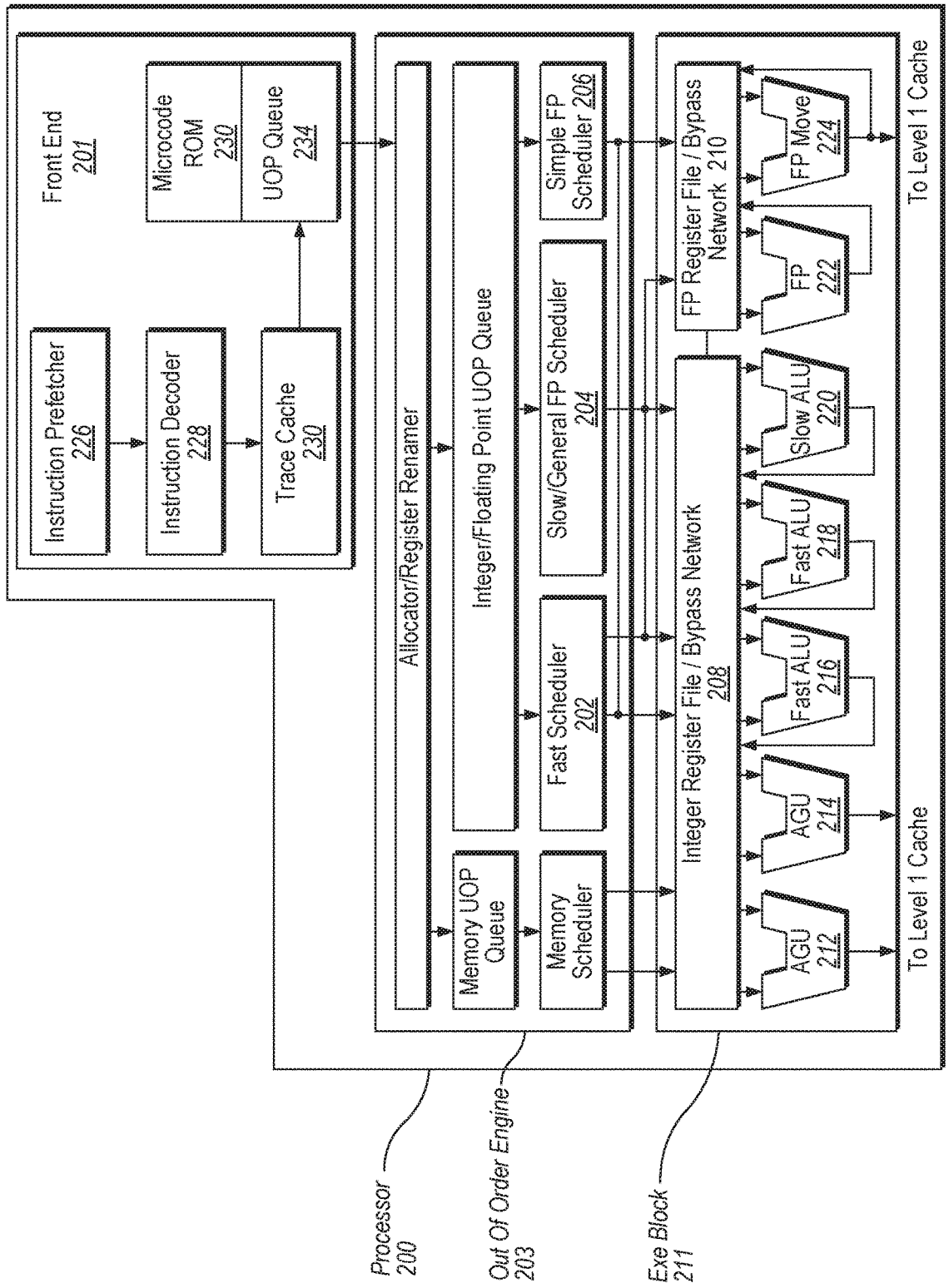
FIG. 7 depicts a block diagram of a processor, in accordance with one or more aspects of the present disclosure.

FIG. 7 is a block diagram of the micro-architecture for a processor 200 that includes logic circuits to perform instructions in accordance with one or more aspects of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in certain implementations, the decoder decodes a received instruction into one or more operations called "micro-instructions" or "micro-operations" (also referred to as uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete an instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to an entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register aliasing logic maps logical registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206 determine when a uop is ready to execute based on the readiness of their dependent input register operand sources and the availability of the execution resources the uops need to complete their operation. The fast scheduler 202 of one embodiment can schedule on each half of the main clock cycle while the other schedulers can schedule once per main processor clock cycle. The schedulers arbitrate for the dispatch ports to schedule uops for execution.

Physical register files 208, 210 sit between the schedulers 202, 204, 206, and the execution units 212, 214, 216, 218, 220, 222, 224 in the execution block 211. There is a separate register file 208, 210 for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For systems and methods described herein, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220 are described in the context of performing integer operations on 64 bit data operands. In alternative embodiments, the ALUs 216, 218, 220 can be implemented to support a variety of data bits including 16, 32, 128, 256, etc. Similarly, the floating point units 222, 224 can be implemented to support a range of operands having bits of various widths. For one embodiment, the floating point units 222, 224 can operate on 128 bits wide packed data operands in conjunction with SIMD and multimedia instructions.

In one embodiment, the uops schedulers 202, 204, 206 dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register aliasing, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

FIGS. 8a-8b schematically illustrate elements of a processor micro-architecture, in accordance with one or more aspects of the present disclosure. In FIG. 8a, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 8b, arrows denote a coupling between two or more units and the direction of the arrow indicates a direction of data flow between those units. FIG. 8b shows processor core 111 including a front end unit 430 coupled to an execution engine unit 450, and both are coupled to a memory unit 470.

The core 111 may be a reduced instruction set computing (RISC) core, a complex instruction set computing (CISC) core, a very long instruction word (VLIW) core, or a hybrid or alternative core type. As yet another option, the core 111 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register aliasing and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register aliasing, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register aliasing, out-of-order issue/execution core architecture may implement the pipeline 400 as follows: the instruction fetch 438 performs the fetch and length decoding stages 402 and 404; the decode unit 440 performs the decode stage 406; the rename/allocator unit 452 performs the allocation stage 408 and renaming stage 410; the scheduler unit(s) 456 performs the schedule stage 412; the physical register file(s) unit(s) 458 and the memory unit 470 perform the register read/memory read stage 414; the execution cluster 460 perform the execute stage 416; the memory unit 470 and the physical register file(s) unit(s) 458 perform the write back/memory write stage 418; various units may be involved in the exception handling stage 422; and the retirement unit 454 and the physical register file(s) unit(s) 458 perform the commit stage 424.

The core 111 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

In certain implementations, the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register aliasing is described in the context of out-of-order execution, it should be understood that register aliasing may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

In certain implementations, processor core 111 may be designed as an out-of-order (OOO) core in order to improve the performance by executing instructions as soon as their operands become available, rather than in the program order. However, the performance benefit may be offset by a considerable increase in the power consumption. When multiple execution threads are available for the operating system to schedule, employing multiple in-order cores rather than large OOO cores may improve the energy consumption profile of the processor without compromising the overall performance. Thus, to improve the performance and energy consumption scalability of a processor, the latter may be designed to support a variable number of cores depending on the performance needs and the number of threads available to the operating system for scheduling.

Figure 9:
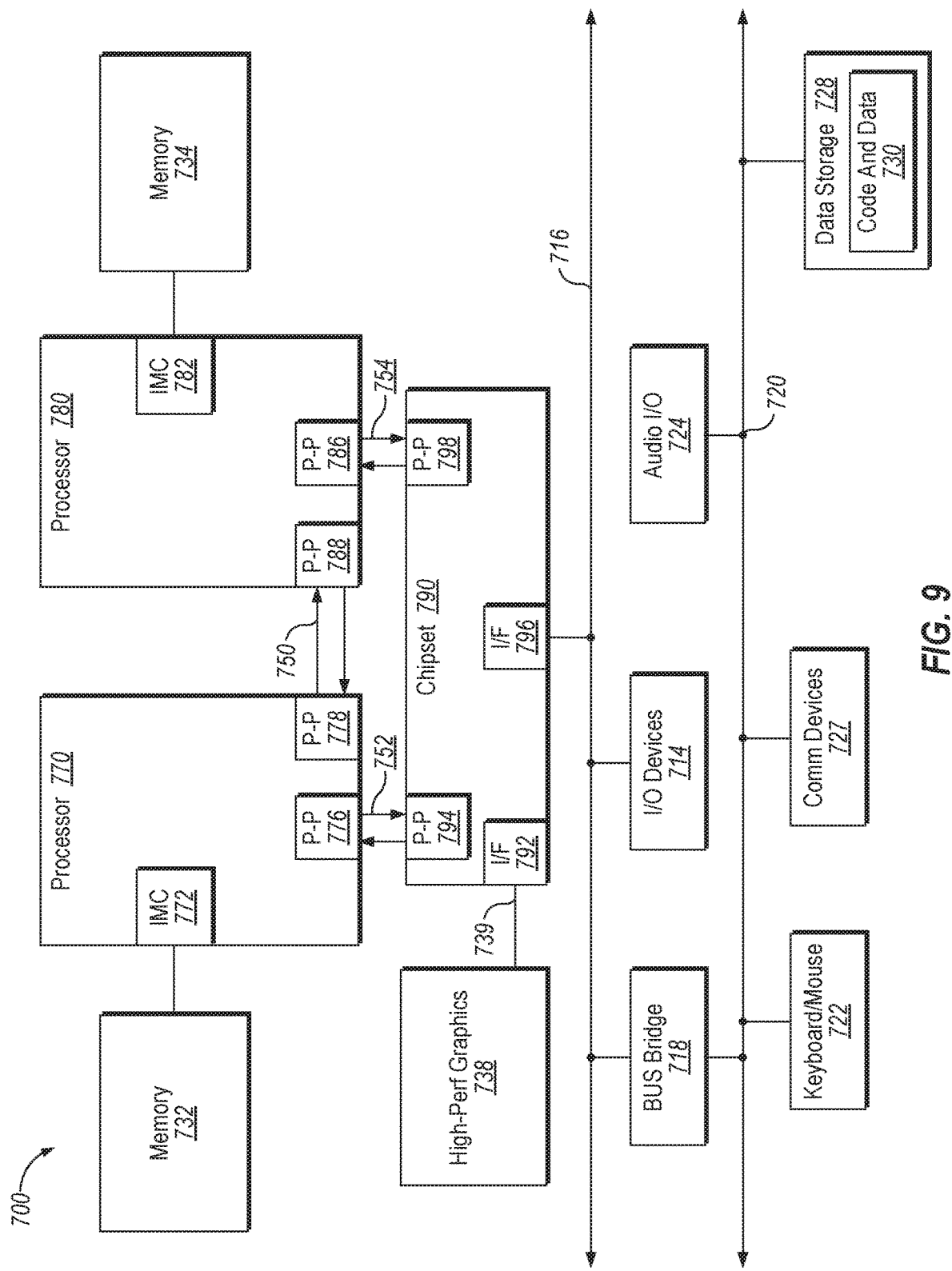
FIG. 9 depicts a block diagram of an example computer system, in accordance with one or more aspects of the present disclosure.

FIG. 9 depicts a block diagram of an example computer system 700, in accordance with one or more aspects of the present disclosure. As shown in FIG. 9, multiprocessor system 700 is a point-to-point interconnect system, and includes a first processor 770 and a second processor 780 coupled via a point-to-point interconnect 750. Each of processors 770 and 780 may be some version of processing system 100 capable of implementing virtual machine-based protected video paths, as described in more details herein above. While shown with only two processors 770, 780, it is to be understood that the scope of the present disclosure is not so limited. In other embodiments, one or more additional processors may be present in the example computer system.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 9, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 9, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720.

Figure 10:
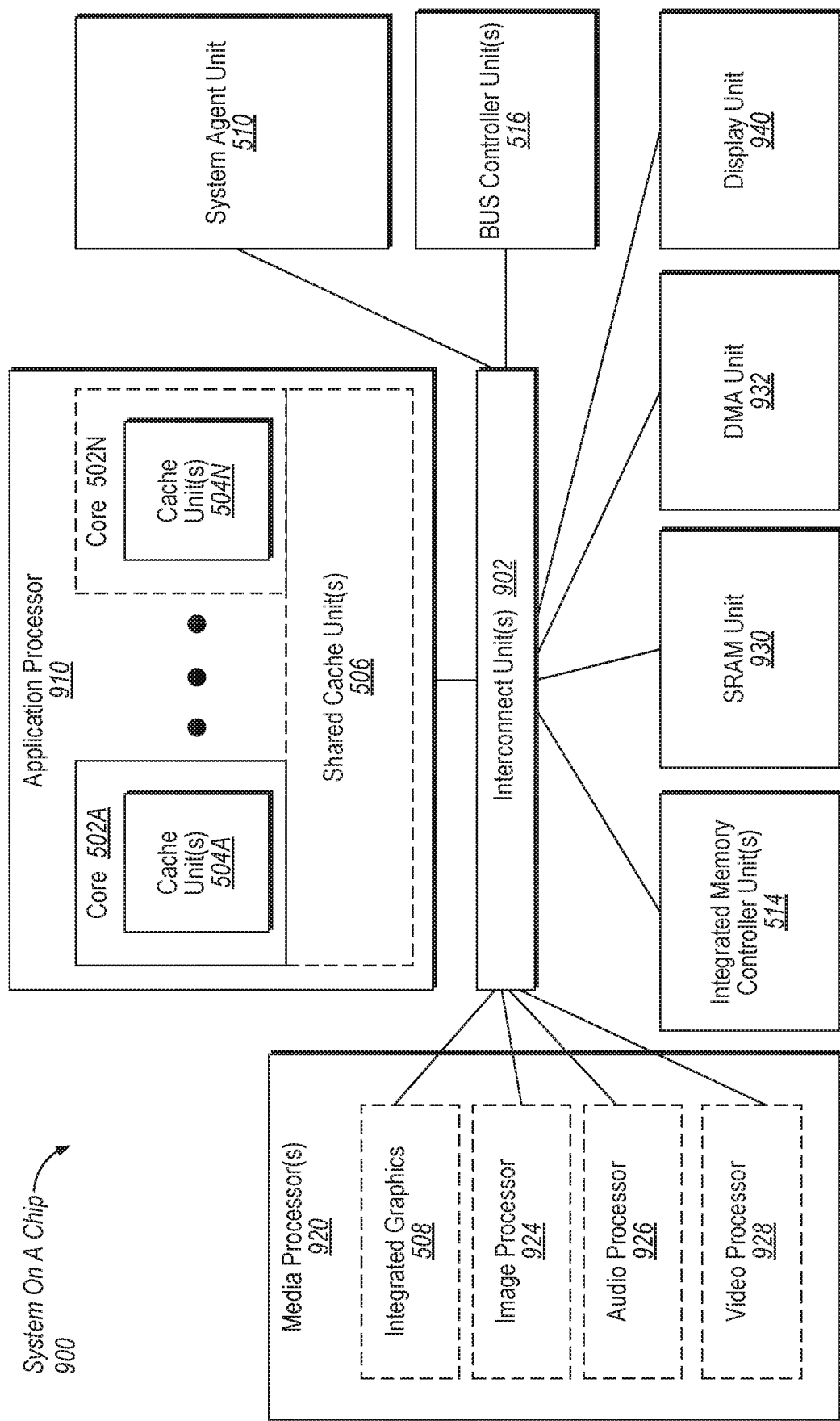
FIG. 10 depicts a block diagram of an example system on a chip (SoC), in accordance with one or more aspects of the present disclosure.

FIG. 10 depicts a block diagram of an example system on a chip (SoC) 900, in accordance with one or more aspects of the present disclosure. The application processor 910 provided by some version of processing system 100 capable of implementing virtual machine-based protected video paths, as described in more details herein above. As schematically illustrated by FIG. 10, interconnect unit(s) 902 may be coupled to: an application processor 910 which includes a set of one or more cores 902A-N and shared cache unit(s) 906; a system agent unit 910; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 11:
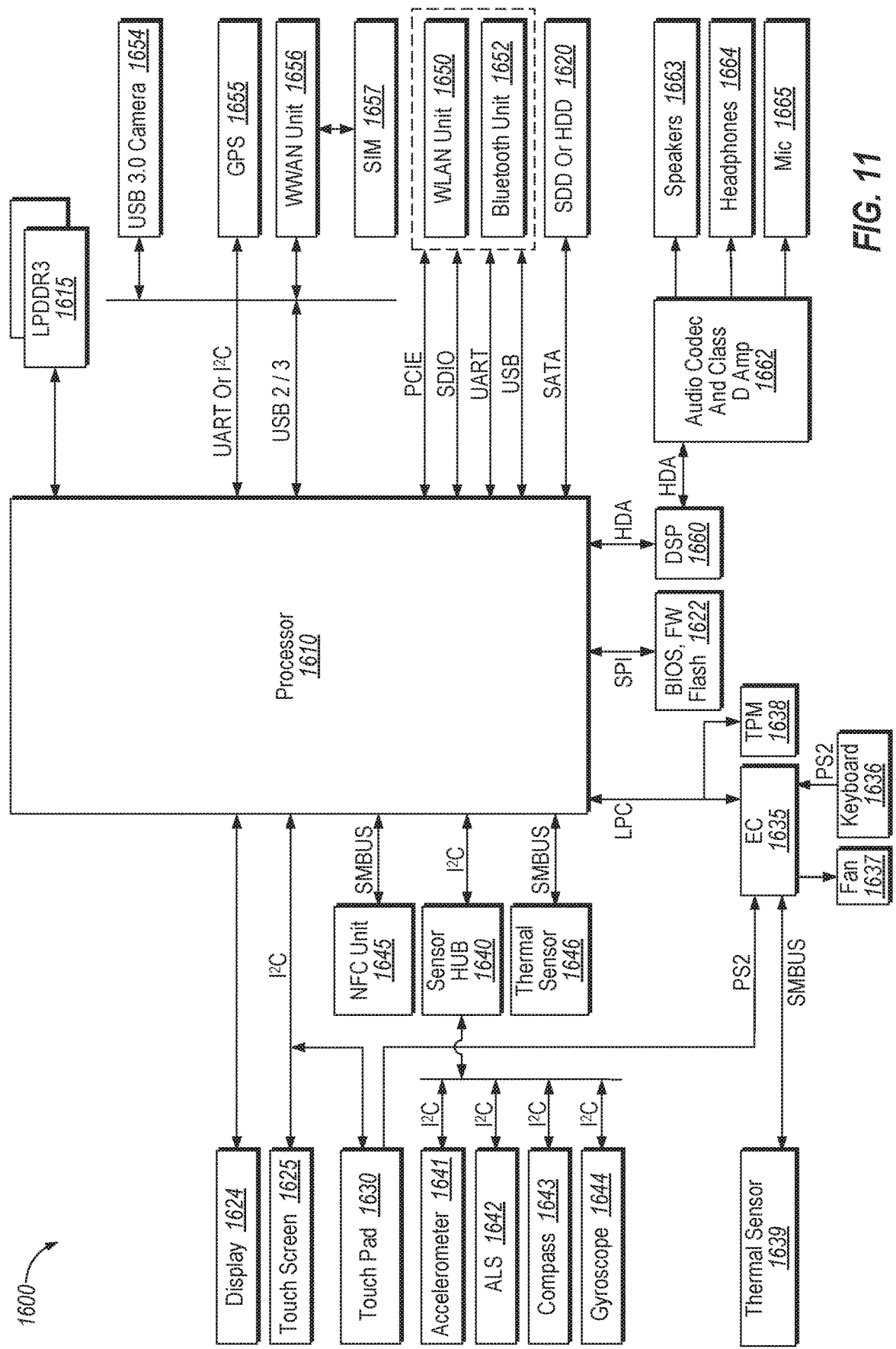
FIG. 11 depicts a block diagram of an example computer system, in accordance with one or more aspects of the present disclosure.

FIG. 11 depicts a block diagram of an example computer system, in accordance with one or more aspects of the present disclosure. Processor 1610 may be provided by some version of processing system 100 capable of implementing virtual machine-based protected video paths, as described in more details herein above.

The system 1600 schematically illustrated by FIG. 11 may include any combination of components implemented as ICs, portions thereof, discrete electronic devices, or other modules, logic, hardware, software, firmware, or a combination thereof adapted in a computer system, or as components otherwise incorporated within a chassis of the computer system. The block diagram of FIG. 11 is intended to show a high level view of many components of the computer system. However, it is to be understood that some of the components shown may be omitted, additional components may be present, and different arrangement of the components shown may occur in other implementations.

Processor 1610 may be provided by a microprocessor, multi-core processor, multithreaded processor, an ultra low voltage processor, an embedded processor, or other known processing element. In the illustrated implementation, processor 1610 acts as a main processing unit and central hub for communication with many of the various components of the system 1600. As one example, processor 1600 may be implemented as a system on a chip (SoC). As a specific illustrative example, processor 1610 includes an Intel® Architecture Core™-based processor such as an i3, i5, i7 or another such processor available from Intel Corporation, Santa Clara, Calif.

Processor 1610 may communicate with a system memory 1615. In various implementations the individual memory devices may be of different package types such as single die package (SDP), dual die package (DDP) or quad die package (1P). These devices, in some implementations, may be directly soldered onto a motherboard to provide a lower profile solution, while in other implementations the devices may be configured as one or more memory modules that in turn couple to the motherboard by a given connector. Other memory implementations are possible, such as other types of memory modules, e.g., dual inline memory modules (DIMMs) of different varieties including but not limited to microDIMMs, MiniDIMMs. In one illustrative example, the memory may be sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1620 may be also coupled to processor 1610. In certain implementations, to enable a thinner and lighter system design as well as to improve system responsiveness, the mass storage 1620 may be implemented via a SSD. In other implementations, the mass storage may primarily be provided by a hard disk drive (HDD) with a smaller amount of SSD storage to act as a SSD cache to enable non-volatile storage of context state and other such information during power down events so that a fast power up can occur on re-initiation of system activities.

Also shown in FIG. 11, a flash device 1622 may be coupled to processor 1610, e.g., via a serial peripheral interface (SPI). The flash device 1622 may provide for non-volatile storage of system software, including a basic input/output software (BIOS) as well as other firmware of the system.

In various implementations, the mass storage of the system may be provided by a SSD alone or as a disk, optical or other drive with an SSD cache. In some implementations, the mass storage may be provided by an SSD or as a HDD along with a restore (RST) cache module. The SSD cache may be configured as a single level cache (SLC) or multi-level cache (MLC) option to provide an appropriate level of responsiveness.

Various input/output (IO) devices may be present within system 1600, including, e.g., a display 1624 which may be provided by a high definition LCD or LED panel configured within a lid portion of the chassis. This display panel may also provide for a touch screen 1625 adapted externally over the display panel such that via a user's interaction with this touch screen, user inputs can be provided to the system to enable desired operations, e.g., with regard to the display of information, accessing of information and so forth. In certain implementations, display 1624 may be coupled to processor 1610 via a display interconnect that can be implemented as a high performance graphics interconnect. Touch screen 1625 may be coupled to processor 1610 via another interconnect, which in an embodiment can be an I2C interconnect. In addition to touch screen 1625, user input by way of touch can also occur via a touch pad 1630 which may be configured within the chassis and may also be coupled to the same I2C interconnect as touch screen 1625.

Various sensors may be present within the system and may be coupled to processor 1610 in different manners. Certain inertial and environmental sensors may couple to processor 1610 through a sensor hub 1640, e.g., via an I2C interconnect. These sensors may include an accelerometer 1641, an ambient light sensor (ALS) 1642, a compass 1643 and a gyroscope 1644. Other environmental sensors may include one or more thermal sensors 1646 which in some embodiments couple to processor 1610 via a system management bus (SMBus) bus. In certain implementations, one or more infrared or other heat sensing elements, or any other element for sensing the presence or movement of a user may be present.

Various peripheral devices may couple to processor 1610 via a low pin count (LPC) interconnect. In certain implementations, various components can be coupled through an embedded controller 1635. Such components can include a keyboard 1636 (e.g., coupled via a PS2 interface), a fan 1637, and a thermal sensor 1639. In some embodiments, touch pad 1630 may also couple to EC 1635 via a PS2 interface. In addition, a security processor such as a trusted platform module (TPM) 1638 in accordance with the Trusted Computing Group (TCG) TPM Specification Version 1.2, dated Oct. 2, 2003, may also couple to processor 1610 via this LPC interconnect.

In certain implementations, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1600 can communicate with external devices in a variety of manners, including wirelessly. In the embodiment shown in FIG. 16, various wireless modules, each of which can correspond to a radio configured for a particular wireless communication protocol, are present. One manner for wireless communication in a short range such as a near field may be via a near field communication (NFC) unit 1645 which may communicate, in one embodiment with processor 1610 via an SMBus.

Additional wireless units can include other short range wireless engines including a WLAN unit 1650 and a Bluetooth unit 1652. Using WLAN unit 1650, Wi-Fi™ communications in accordance with a given Institute of Electrical and Electronics Engineers (IEEE) 802.11 standard can be realized, while via Bluetooth unit 1652, short range communications via a Bluetooth protocol can occur. These units may communicate with processor 1610 via, e.g., a USB link or a universal asynchronous receiver transmitter (UART) link. Or these units may couple to processor 1610 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1656 which in turn may couple to a subscriber identity module (SIM) 1657. In addition, to enable receipt and use of location information, a GPS module 1655 may also be present.

To provide for audio inputs and outputs, an audio processor can be implemented via a digital signal processor (DSP) 1660, which may couple to processor 1610 via a high definition audio (HDA) link. Similarly, DSP 1660 may communicate with an integrated coder/decoder (CODEC) and amplifier 1662 that in turn may couple to output speakers 1663 which may be implemented within the chassis. Similarly, amplifier and CODEC 1662 can be coupled to receive audio inputs from a microphone 1665.

Figure 12:
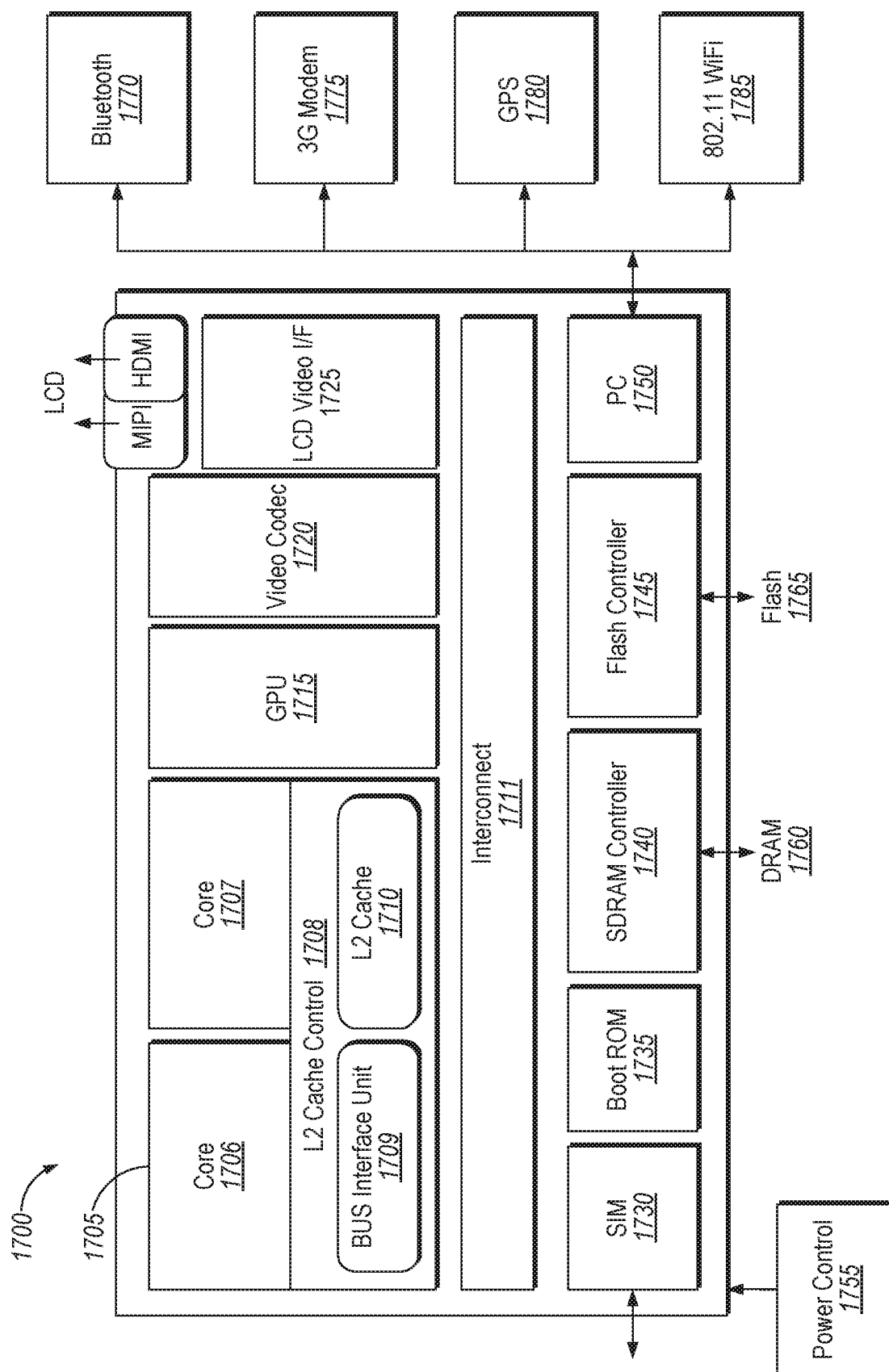
FIG. 12 depicts a block diagram of an example system on a chip (SoC), in accordance with one or more aspects of the present disclosure.

FIG. 12 depicts a block diagram of an example system on a chip (SoC), in accordance with one or more aspects of the present disclosure. As a specific illustrative example, SOC 1700 may be included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

As schematically illustrated by FIG. 12, SOC 1700 may include two cores. Cores 1706 and 1707 may be coupled to cache control 1708 that is associated with bus interface unit 1709 and L2 cache 1710 to communicate with other parts of system 1700. Interconnect 1710 may include an on-chip interconnect, such as an IOSF, AMBA, or other interconnect.

Interface 1710 may provide communication channels to the other components, such as a Subscriber Identity Module (SIM) 1730 to interface with a SIM card, a boot ROM 1735 to hold boot code for execution by cores 1706 and 1707 to initialize and boot SOC 1700, a SDRAM controller 1740 to interface with external memory (e.g., DRAM 1760), a flash controller 1745 to interface with non-volatile memory (e.g., flash 1765), a peripheral control 1550 (e.g., Serial Peripheral Interface) to interface with peripherals, video codecs 1720 and Video interface 1725 to display and receive input (e.g., touch enabled input), GPU 1715 to perform graphics related computations, etc. In addition, the system may comprise peripherals for communication, such as a Bluetooth module 1770, 3G modem 1775, GPS 1785, and WiFi 1785.

Other computer system designs and configurations may also be suitable to implement the systems and methods described herein. The following examples illustrate various implementations in accordance with one or more aspects of the present disclosure.

Example 1 is a processing system, comprising: a memory configured to store a plurality of user-level Advanced Programmable Interrupt Controller (APIC) data structures and a plurality of user-level interrupt handler address data structures corresponding to a plurality of user-level applications being executed by the processing system; and a processing core configured, responsive to receiving a notification of a user-level interrupt, to: set a pending interrupt bit flag having a position defined by an identifier of the user-level interrupt in a user-level APIC data structure associated with a user-level application that is currently being executed by the processing core, and invoke a user-level interrupt handler identified by a user-level interrupt handler address data structure associated with the user-level application, for a pending user-level interrupt having a highest priority among one or more pending user-level interrupts identified by the user-level APIC data structure.

In Example 2, the processing core of the processing system of Example 1 is further configured, responsive to setting the pending interrupt bit flag, to trigger a micro-architectural event indicating presence of a pending user-level interrupt.

In Example 3, the processing core of the processing system of Example 2 is configured to invoke the user-interrupt handler responsive to detecting the micro-architectural event indicating presence of the pending user-level interrupt.

Example 4 is the processing system of any of Examples 1-3, wherein each user-level APIC data structure of the plurality of user-level APIC data structures includes a bitmap comprising plurality of pending interrupt bits, wherein a position of each bit within the bitmap corresponds to an interrupt identifier.

Example 5 is the processing system of any of Examples 1-3, wherein each user-level interrupt handler address data structure comprises a table of addresses of user-level interrupt handlers indexed by an interrupt identifier.

Example 6 is the processing system of any of Examples 1-3, wherein each user-level interrupt handler address data structure comprises an address of a single interrupt handler for multiple types of user-level interrupts to be processed by a user-level application associated with the user-level interrupt handler address data structure.

Example 6 is the processing system of any of Examples 1-3, further comprising a processing logic configured to: responsive to identifying an incoming interrupt as a user-level interrupt, identify an address of a posted interrupt descriptor associated with the user-level application that is currently being executed by the processing core; set a bit corresponding to an identifier of the interrupt in a bitmap associated with the posted interrupt descriptor; and transmit a notification interrupt having an interrupt number identified by the posted interrupt descriptor.

In Example 8, the processing core of the processing system of Example 7 is further configured to compare an identifier of an incoming interrupt with an identifier reserved for the notification interrupt.

Example 9 is the processing system of any of Examples 1-3, wherein invoking the user-level interrupt handler further comprises: storing a current value of an instruction pointer on a stack; and loading an address of the user-level interrupt handler into the instruction pointer.

Example 9 is the processing system of any of Examples 1-3, wherein the processing system is represented by a System-on-Chip (SoC).

Example 11 is a method, comprising: receiving a notification of a user-level interrupt; setting a pending interrupt bit corresponding to an identifier of the user-level interrupt in a user-level APIC data structure associated with a user-level application that is currently being executed by the processing core; identifying, using the user-level APIC data structure, a pending user-level interrupt having a highest priority among one or more pending user-level interrupts; and identifying, using a user-level interrupt handler address data structure associated with the user-level application, an interrupt handler for the identified user-level interrupt.

Example 12 is the method of Example 11, further comprising: responsive to setting the pending interrupt bit flag, triggering a micro-architectural event indicating presence of a pending user-level interrupt.

Example 13 is the method of Example 12, further comprising: invoking the identified user-interrupt handler responsive to detecting the micro-architectural event indicating presence of the pending user-level interrupt.

Example 14 is the method of Example 13, wherein invoking the user-level interrupt handler further comprises: storing a current value of an instruction pointer on a stack; and loading an address of the user-level interrupt handler into the instruction pointer.

Example 15 is the method of any of Examples 11-14, wherein each user-level APIC data structure of the plurality of user-level APIC data structures includes a bitmap comprising plurality of pending interrupt bits, wherein a position of each bit within the bitmap corresponds to an interrupt identifier.

Example 16 is the method of any of Examples 11-14, wherein each user-level interrupt handler address data structure comprises a table of addresses of user-level interrupt handlers indexed by an interrupt identifier.

Example 17 is the method of any of Examples 11-14, wherein each user-level interrupt handler address data structure comprises an address of a single interrupt handler for multiple types of user-level interrupts to be processed by a user-level application associated with the user-level interrupt handler address data structure.

Example 18 is the method of any of Examples 11-14, further comprising: responsive to identifying an incoming interrupt as a user-level interrupt, identifying an address of a posted interrupt descriptor associated with the user-level application that is currently being executed by the processing core; setting a bit corresponding to an identifier of the interrupt in a bitmap associated with the posted interrupt descriptor; and transmitting a notification interrupt having an interrupt number identified by the posted interrupt descriptor.

Example 16 is the method of Example 18, further comprising: comparing an identifier of an incoming interrupt with an identifier reserved for the notification interrupt.

Example 20 is an apparatus comprising: a memory; and a processing system coupled to the memory, the processing system to perform the method of any of Examples 11-19.

Example 21 is a computer-readable non-transitory storage medium comprising executable instructions that, when executed by a processing system, cause the processing system to perform operations, comprising: receiving a notification of a user-level interrupt; setting a pending interrupt bit corresponding to an identifier of the user-level interrupt in a user-level APIC data structure associated with a user-level application that is currently being executed by the processing core; identifying, using the user-level APIC data structure, a pending user-level interrupt having a highest priority among one or more pending user-level interrupts; and identifying, using a user-level interrupt handler address data structure associated with the user-level application, an interrupt handler for the identified user-level interrupt.

Example 22 is a computer-readable non-transitory storage medium of Example 21, further comprising executable instructions causing the processing system, responsive to setting the pending interrupt bit flag, trigger a micro-architectural event indicating presence of a pending user-level interrupt.

Example 23 is a computer-readable non-transitory storage medium of Example 22, further comprising executable instructions causing the processing system to invoke the identified user-interrupt handler responsive to detecting the micro-architectural event indicating presence of the pending user-level interrupt.

Example 24 is a computer-readable non-transitory storage medium of Example 23, wherein invoking the user-level interrupt handler further comprises: storing a current value of an instruction pointer on a stack; and loading an address of the user-level interrupt handler into the instruction pointer.

Example 25 is a computer-readable non-transitory storage medium of any of Examples 21-24, wherein each user-level APIC data structure of the plurality of user-level APIC data structures includes a bitmap comprising plurality of pending interrupt bits, wherein a position of each bit within the bitmap corresponds to an interrupt identifier.

Example 26 is a computer-readable non-transitory storage medium of any of Examples 21-24, wherein each user-level interrupt handler address data structure comprises a table of addresses of user-level interrupt handlers indexed by an interrupt identifier.

Example 27 is a computer-readable non-transitory storage medium of any of Examples 21-24, wherein each user-level interrupt handler address data structure comprises an address of a single interrupt handler for multiple types of user-level interrupts to be processed by a user-level application associated with the user-level interrupt handler address data structure.

Example 28 is a computer-readable non-transitory storage medium of any of Examples 21-24, further comprising executable instructions causing the processing system, responsive to identifying an incoming interrupt as a user-level interrupt, to: identify an address of a posted interrupt descriptor associated with the user-level application that is currently being executed by the processing core; set a bit corresponding to an identifier of the interrupt in a bitmap associated with the posted interrupt descriptor; and transmit a notification interrupt having an interrupt number identified by the posted interrupt descriptor.

Example 29 is a computer-readable non-transitory storage medium of Example 28, further comprising executable instructions causing the processing system to compare an identifier of an incoming interrupt with an identifier reserved for the notification interrupt.

Some content portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A processing system, comprising:
    a memory to store an interrupt control data structure associated with an application being executed by the processing system; and
    a processing core to, without a privilege level transition:
        determine that an identifier of a pending interrupt matches a notification interrupt vector associated with the application,
        set, in the interrupt control data structure, a pending interrupt flag corresponding to an identifier of the interrupt,
        select a highest priority pending interrupt among pending interrupts identified by the interrupt control data structure, and
        invoke an interrupt handler for the highest priority pending interrupt identified by the interrupt control data structure.

2. The processing system of claim 1, wherein the processing core is further to:
    responsive to setting the pending interrupt flag, trigger a micro-architectural event indicating pendency of the user-level interrupt.

3. The processing system of claim 2, wherein the processing core is further to:
    invoke the interrupt handler responsive to detecting the micro-architectural event.

4. The processing system of claim 1, wherein the interrupt control data structure includes a bitmap comprising plurality of pending interrupt bits, wherein a position of each bit within the bitmap corresponds to an interrupt identifier.

5. The processing system of claim 1, further comprising a processing logic to:
    responsive to identifying an incoming interrupt as a user-level interrupt, identify an address of a posted interrupt descriptor associated with the application;
    set, in the posted interrupt descriptor data structure, a flag corresponding to an identifier of the incoming interrupt; and
    transmit a notification interrupt having an interrupt number identified by the posted interrupt descriptor.

6. The processing system of claim 1, wherein invoking the interrupt handler further comprises:
    storing a current value of an instruction pointer on a stack; and
    loading an address of the interrupt handler into the instruction pointer.

7. The processing system of claim 1, wherein the processing system is represented by a System-on-Chip (SoC).

8. The processing system of claim 1, wherein the notification interrupt vector is identified by a pre-defined field of a posted interrupt descriptor data structure associated with the user-level application.

9. A method, comprising:
    determining, by a processing core without a privilege level transition, that an identifier of a pending interrupt matches a notification interrupt vector associated with an application being executed by the processing core;
    setting, in an interrupt control data structure associated with the application, a pending interrupt flag corresponding to an identifier of the interrupt;
    selecting a highest priority pending interrupt among pending interrupts identified by the interrupt control data structure; and
    invoking an interrupt handler for the highest priority pending interrupt identified by the interrupt control data structure.

10. The method of claim 9, further comprising:
    responsive to setting the pending interrupt flag, triggering a micro-architectural event indicating pendency of the user-level interrupt.

11. The method of claim 10, further comprising:
    invoking the interrupt handler responsive to detecting the micro-architectural event.

12. The method of claim 9, wherein invoking the user-level interrupt handler further comprises:
    storing a current value of an instruction pointer on a stack; and
    loading an address of the interrupt handler into the instruction pointer.

13. The method of claim 9, wherein the interrupt control data structure includes a bitmap comprising plurality of pending interrupt bits, wherein a position of each bit within the bitmap corresponds to an interrupt identifier.

14. The method of claim 9, further comprising:
    responsive to identifying an incoming interrupt as a user-level interrupt, identifying an address of a posted interrupt descriptor associated with the application;
    setting, in the posted interrupt descriptor data structure, a flag corresponding to an identifier of the incoming interrupt; and
    transmitting a notification interrupt having an interrupt number identified by the posted interrupt descriptor.

15. The method of claim 9, wherein the notification interrupt vector is identified by a pre-defined field of a posted interrupt descriptor data structure associated with the user-level application.

16. A computer-readable non-transitory storage medium comprising executable instructions that, when executed by a processing system, cause the processing system to:
- determine, without a privilege level transition, that an identifier of a pending interrupt matches a notification interrupt vector associated with an application being executed by the processing system;
- set, in an interrupt control data structure associated with the application, a pending interrupt flag corresponding to an identifier of the interrupt;
- selecting a highest priority pending interrupt among pending interrupts identified by the interrupt control data structure; and
- invoke an interrupt handler for the highest priority pending interrupt identified by the interrupt control data structure.

17. The computer-readable non-transitory storage medium of claim 16, wherein the notification interrupt vector is identified by a pre-defined field of a posted interrupt descriptor data structure associated with the user-level application.

18. The computer-readable non-transitory storage medium of claim 16, wherein the interrupt control data structure includes a bitmap comprising plurality of pending interrupt bits, wherein a position of each bit within the bitmap corresponds to an interrupt identifier.

19. The computer-readable non-transitory storage medium of claim 16, further comprising executable instructions that, when executed by the processing system, cause the processing system to:
- responsive to identifying an incoming interrupt as a user-level interrupt, identifying an address of a posted interrupt descriptor associated with the application;
- setting, in the posted interrupt descriptor data structure, a flag corresponding to an identifier of the incoming interrupt; and
- transmitting a notification interrupt having an interrupt number identified by the posted interrupt descriptor.

* * * * *